United States Patent [19]

Miyake et al.

[11] Patent Number: 5,530,046
[45] Date of Patent: Jun. 25, 1996

[54] METHOD FOR PRODUCING AN OXIDATION-TREATED POLYMER SOLUTION AND A METHOD FOR PRODUCING A LAMINATE USING THE SOLUTION

[75] Inventors: Shinji Miyake, Osaka; Junko Fujita, Kyoto; Hiroshi Takida, Takatsuki, all of Japan

[73] Assignee: Nippon Gohsei Kagaku Kogyo Kabushiki Kaisha, Osaka, Japan

[21] Appl. No.: 351,308

[22] PCT Filed: Sep. 24, 1993

[86] PCT No.: PCT/JP93/01371

§ 371 Date: Dec. 13, 1994

§ 102(e) Date: Dec. 13, 1994

[87] PCT Pub. No.: WO94/24171

PCT Pub. Date: Oct. 27, 1994

[30] Foreign Application Priority Data

Apr. 15, 1993 [JP] Japan ..................... 5-113906
Apr. 27, 1993 [JP] Japan ..................... 5-125242
May 11, 1993 [JP] Japan ..................... 5-133821

[51] Int. Cl.$^6$ .................................................. C08K 5/05
[52] U.S. Cl. .................. 524/389; 156/327; 427/256; 427/223; 427/316; 427/322; 427/536; 427/537; 427/393.5; 524/379; 524/557; 524/503; 525/61

[58] Field of Search ................... 524/379, 389, 524/503, 557; 525/61; 156/327; 427/256, 393.5, 223, 316, 322, 536, 537

[56] References Cited

U.S. PATENT DOCUMENTS

| | | | |
|---|---|---|---|
| 2,541,478 | 2/1951 | Nadeau et al. | 525/61 X |
| 3,053,605 | 9/1962 | Tanabe et al. | 525/61 X |
| 3,459,724 | 8/1969 | Hartel et al. | 525/61 |
| 3,859,269 | 1/1975 | Maurer | 525/61 |
| 4,931,500 | 6/1990 | Okamoto et al. | 525/61 X |
| 5,164,438 | 11/1992 | Umeyama et al. | 525/61 X |
| 5,258,430 | 11/1993 | Bastioli et al. | 524/52 |
| 5,317,052 | 5/1994 | Ohba et al. | 525/61 X |

FOREIGN PATENT DOCUMENTS

| | | |
|---|---|---|
| 55-89304 | 7/1980 | Japan . |
| 3-263407 | 11/1991 | Japan . |

*Primary Examiner*—Judy M. Reddick
*Attorney, Agent, or Firm*—Armstrong, Westerman, Hattori, McLeland & Naughton

[57] ABSTRACT

A saponified ethylene-vinyl acetate copolymer is oxidation-treated in solution in a solvent mixture of water and alcohol in the presence of hydrogen peroxide and a polyvalent metal salt to provide an oxidation-treated polymer solution. This oxidation-treated polymer solution is coated on a substrate, e.g. a polymer film, to provide a laminate.

2 Claims, No Drawings

METHOD FOR PRODUCING AN OXIDATION-TREATED POLYMER SOLUTION AND A METHOD FOR PRODUCING A LAMINATE USING THE SOLUTION

FIELD OF THE INVENTION

The present invention relates to a method for producing an oxidation-treated polymer solution comprising oxidizing a saponified ethylene-vinyl acetate copolymer (hereinafter sometime referred to briefly as EVOH) in a solution form and a method for producing a laminate having an oxygen-barrier property which comprises coating the surface of a substrate, such as a plastic substrate, with the oxidation-treated polymer solution.

BACKGROUND OF THE INVENTION

The film obtainable from EVOH is transparent and excellent in oxygen-barrier property and, therefore, laminates of EVOH film with other plastic film, paper, metal foil, etc. are useful packing materials for foodstuffs, pharmaceutical products, industrial chemicals and so on.

Any desired technique available can be employed for forming an EVOH film on a substrate but the solution coating method comprising coating the surface of a substrate with a solvent solution of EVOH is attracting attention because a comparatively thick film can be formed, the film can be easily formed even on a substrate having a complicated profile, such as a hollow vessel, and the coating can be performed with a comparatively simple apparatus.

However, a solution obtainable by dissolving the ordinary EVOH in a solvent mixture of water and alcohol has a poor storage stability, i.e. a short pot life, and when stored at room temperature, becomes opacified in a few days and ultimately solidifies. Therefore, it is poor in handlability, requiring a field operation, such as redissolving EVOH by heating the solution at 60°–80° C. for a few hours, for instance, immediately before use. Furthermore, this EVOH solution is so high in viscosity that it is inferior in high-speed coatability.

For improving the stability of an EVOH solution, a method comprising adding boric acid to EVOH has been proposed (Kokai Tokkyo Koho H-2-47144) but even with such contrivances the storage stability cannot be said to be sufficient. Moreover, because of the high viscosity, the high-speed coatability is not improved at all.

Thus, the conventional ordinary EVOH solution or the solution prepared by adding boric acid thereto is unsuitable as a coating.

Kokai Tokkyo Koho H-4-500834 describes the use, in a polymer composition for the production of a biodegradable plastic product made up of a modified starch and a synthetic polymer comprising EVOH or polyvinyl alcohol, of a polymer oxidized by reaction with hydrogen peroxide and persulfuric acid as said polymer.

However, when EVOH is dissolved in a solvent and oxidation-modified by the reaction with hydrogen peroxide and persulfuric acid, the problem remains that the resulting oxidation-treated polymer solution becomes colorized, its standing stability is adversely affected, and the gas-barrier property of the coating film is sacrificed.

OBJECTS OF THE INVENTION

Under the circumstances the present invention has for its object to provide a method for producing an EVOH solution having good standing stability and high-speed coatability and capable of forming a film with good gas-barrier property and transparency and a method for producing a laminate comprising coating a substrate with said EVOH solution.

SUMMARY OF THE INVENTION

The method for producing an oxidation-treated polymer solution in accordance with the present invention is characterized by using a saponified ethylene-vinyl acetate copolymer (EVOH) satisfying all the following relations $20 \leq Et \leq 60$, $90 \leq SV \leq 100$, $Tm \geq -109 - 1.46\ Et + 3.31\ SV$ where $Et$ (mol %) represents the ethylene content of saponified ethylene-vinyl acetate copolymer (EVOH), $SV$ (mol %) represents the degree of saponification of EVOH, and $Tm$ (°C.) represents the melting point of EVOH as found from the peak temperature measured with a differential scanning calorimeter, as the starting polymer and oxidation-treating said starting polymer in solution in a solvent mixture of water and alcohol in the concomitant presence of hydrogen peroxide and a polyvalent metal salt to provide an oxidation-treated polymer satisfying the relation $-209 - 1.46\ Et + 3.31\ SV < T < -109 - 1.46\ Et + 3.31\ SV$ (where $T$ (°C.) is the melting point found from the peak temperature measured with a differential scanning calorimeter) in a solution form.

The method for producing a laminate in accordance with this invention is characterized in that the oxidation-treated polymer solution obtained by the above method is coated on a substrate.

DETAILED DESCRIPTION OF THE INVENTION

The present invention is now described in detail.

(Starting polymer)

EVOH, as the starting polymer, is generally obtained by solution-polymerizing ethylene and vinyl acetate in the presence of a solvent, such as methanol, and a polymerization catalyst and, thereafter, saponifying the vinyl acetate fraction with alkali (acid depending on cases). In this polymerization, small amounts of comonomers such as α-olefins (propylene, isobutene, α-octene, α-dodecene, α-octadecene, etc.), unsaturated carboxylic acids and salts, partial alkyl esters, complete alkyl esters, nitriles, amides or anhydrides thereof, unsaturated sulfonic acids and salts thereof, among others, can be used concomitantly.

This starting EVOH must satisfy the relations $20 \leq Et \leq 60$, $90 \leq SV \leq 100$, that is to say an ethylene content ET of 20–60 mol % (preferably 25–55 mol %) and a vinyl acetate saponification degree SV of 90–100 mol % (preferably 95–100 mol %. If the ethylene content (Et) is 20 mol %, the gas-barrier performance under high-humidity conditions is sacrificed. If it exceeds 60 mol %, the gas-barrier property is sacrificed and, at the same time, the printability and other characteristics of the film are adversely affected. Meanwhile, if the degree of saponification is less than 90 mol %, both gas-barrier property and moisture resistance are sacrificed.

In addition, the starting EVOH must be such that its melting point, Tm (°C.), as found from the peak temperature measured with a differential scanning calorimeter (DSC) satisfies the following relation.

$$Tm \geq -109 - 1.46\, Et + 3.31\, SV$$

In the right-hand term, Et stands for ethylene content (mol %) and SV for the degree of saponification (mol %) of the vinyl acetate fraction. If an attempt is made to produce a polymer with a melting point Tm below the above range, it becomes necessary to use a polymerization catalyst and a chain transfer agent in substantial amounts so that the fundamental physical properties of the polymer are adversely affected.

(Oxidation treatment)

In this invention, the above starting polymer in solution in a solvent mixture of water and alcohol is oxidation-treated in the concomitant presence of hydrogen peroxide and a polyvalent metal salt to provide an oxidation-treated polymer satisfying the relation $$-209 - 1.46\, Et + 3.31\, SV < T < -109 - 1.46\, Et + 3.31\, SV$$

(where T (°C.)) represents the melting point found from the peak temperature measured with a differential scanning calorimeter) in a solution form. The most outstanding innovation point of the present invention is that the oxidation treatment is carried out using a polyvalent metal salt together with hydrogen peroxide.

The alcohol that can be used includes lower alcohols of 1–4 carbon atoms, i.e. methanol, ethanol, n-propanol, isopropyl alcohol, n-butanol, isobutyl alcohol, sec-butanol and t-butanol, and isopropyl alcohol is particularly important.

The mixing ratio of water to alcohol is preferably 10:90 through 90:10 by weight. Outside this range, a homogeneous EVOH solution can hardly be obtained and the film formed on coating a substrate would be opaque. The particularly preferred range for the mixing ratio of water to alcohol is 30:70 through 70:30 by weight.

In this connection, along with water and alcohol, such solvents as phenols, carboxylic acids, amines, amides, dimethyl sulfoxide, etc. can be additionally used within the range not contrary to the spirit of the invention.

Hydrogen peroxide is generally used in the form of a concentrated aqueous solution of about 10–35 weight % concentration and its amount is preferably 1–100 weight %, on a pure $H_2O_2$ basis, relative to the starting EVOH. If the amount of hydrogen peroxide is too small, the oxidation treatment does not proceed smoothly. On the other hand, if it is excessive, the reduction of molecular weight becomes considerable and the physical properties of the coating film are adversely affected.

As the polyvalent metal salt, among the hydrochlorides, sulfates, sulfites, nitrates, nitrites, etc. of polyvalent metals such as Fe, Ni, Co, Cu, Mn, Cr, Mo, W, Ce, Os, V, Ti, etc., those which are water-soluble and do not colorize the system are employed, and Fe salts, Cu salts, Cr salts and Ti salts are particularly important.

The amount of the polyvalent metal salt that should be present in the oxidation treatment is preferably 1–3000 ppm, especially 5–2000 ppm, on a polyvalent metal basis, with respect to the whole solution. If the amount of the polyvalent metal salt present is too small, the oxidation treatment does not proceed smoothly and the standing stability and high-speed coatability are sacrificed. On the other hand, if the amount of the polyvalent metal salt is too large, the resulting oxidation-treated polymer is colorized and the oxygen permeability of the coating film is increased.

The procedure for oxidation treatment may typically comprise dissolving the starting polymer (starting EVOH) in a solvent mixture of water and alcohol in a concentration of about 1–50 weight %, adding a concentrated aqueous solution of hydrogen peroxide and a polyvalent metal salt thereto, and stirring the mixture at a temperature of about 40°–90° C. for about 1–50 hours. However, the order of addition of the respective components is not limited to that mentioned above. Thus, for example, the components may be added in one operation or added sequentially in any other order. As to the end-point of the oxidation treatment, the time when the viscosity of the starting material solution has become about 10%, or less, of the initial viscosity can for example be used a reference.

The reaction mixture after completion of the oxidation treatment can be used as it is for coating and other purposes but it is advisable to decompose and dispose of the residual hydrogen peroxide by adding an enzyme such as catalase. The technique for removing the residual hydrogen peroxide is not limited to the method mentioned just above and any suitable method of removal can be utilized only if it is not detrimental to the effect of the invention.

The above oxidation treatment yields an oxidation-treated polymer satisfying the relation:

$$-209 - 1.46\, Et + 3.31\, SV < T < -109 - 1.46\, Et + 3.31\, SV$$

In the above expression, T (°C.) is the melting point of the oxidation-treated polymer.

When T is lower than the above range, the gas-barrier property is insufficient. On the other hand, when it is higher than the above range, the stability of the solution is adversely affected so that it solidifies at room temperature or the high-speed coatability deteriorates to prevent attainment of the object of the invention.

It is permissible, after the oxidation treatment, to concentrate the reaction mixture, dilute it with a suitable solvent, or replace the solvent in the reaction mixture with a suitable different solvent. In such cases, care is exercised to insure that the solvent composition will be one capable of dissolving the oxidation-treated polymer uniformly.

(Laminate)

The oxidation-treated polymer solution obtained by the above method is useful for applications in which laminates are manufactured by coating substrates with the solution. There is no particular limitation on the concentration of the oxidation-treated polymer for this purpose but, in consideration of coatability with respect to various kinds of substrates and standing stability, for instance, a concentration of about 1–50 weight % is preferred.

The substrate mentioned above includes the films, sheets, trays, hollow vessels and tubes (all of which may be oriented or unoriented) of various polymers such as polyethylene, polypropylene, polyester, polystyrene, poly(vinyl chloride), polyamide, polycarbonate, cellulosic polymers, rubber series polymers, etc., paper, nonwoven cloth, metal foil, etc., inclusive of various composites of such materials. The thickness of the substrate is not critical but high practical utility can be obtained when the substrate thickness is about 10–3000 μm.

Generally, for improved adhesion between the substrate and the polymer solution, the substrate is first subjected to surface treatment such as corona discharge treatment, flame treatment, anchor coating or the like and, then, coated with the oxidation-treated polymer solution.

For the application of the oxidation-treated polymer solution for the manufacture of a laminate, any suitable coating method can be selected from among Mayer bar, gravure, reverse-roll and other roller coating methods, spray coating, dip coating, spin coating, etc.

Drying after coating can be carried out at a temperature of about 30°–150° C., preferably about 70°–120° C., until the volatile matter content is reduced to not more than about 10 weight %, preferably not more than about 5 weight % and, for still better results, not more than about 2 weight %.

While, in this manner, a transparent coating layer of the oxidation-treated polymer is formed on the substrate, the practically useful thickness of the layer is about 0.1–100 μm or preferably 0.2–50 μm. If the coating film is too thin, no sufficient gas-barrier property can be expected. On the other hand, increasing the coating thickness results in a longer drying time and, hence, a disadvantage.

After the formation of such a coating layer of oxidation-treated polymer, a moisture-proof layer such as a polyvinyl chloride coating layer or a vinyl chloride-vinyl acetate copolymer coating layer can be superimposed. Moreover, as a surface layer, a polyolefin, polyester or other resin film can be disposed by, for example, the dry lamination method.

The laminates obtained by depositing the above-described oxidation-treated polymer coating layer on substrates are of great use as packaging materials (inclusive of vessels and tubes) for food, beverages, chemicals, drugs, agrochemicals, electronic parts and so on. It finds application also as agricultural film or architectural and car interior materials.

The particularly useful laminate structure for packaging materials or containers includes a laminate consisting of a polyester, polyethylene or other substrate having a thickness of 8–1000 μm and, as formed thereon, a layer of said oxidation-treated polymer having a thickness of 0.5–15 μm and the same laminate as above on which a moisture-proof layer, such as a polyvinylidene chloride layer or a vinyl chloride-vinyl acetate copolymer layer, is further formed in a thickness of 0.5–30 μm or a polyolefin, polyester or other resin film, such as that mentioned above, is formed in a thickness of 10–100 μm.

In addition to such modes of use in which the oxidation-treated polymer forms a surface layer, the polymer can be used as an adhesive agent for the bonding of optical film or the like.

(Effects of the Invention)

In accordance with this invention, an EVOH having a specified copolymer composition and melting point is used as the starting material and this material is oxidation-treated in solution in a solvent mixture of water and alcohol in the presence of hydrogen peroxide and a polyvalent metal salt to provide an oxidation-treated polymer having a specified melting point.

In the conventional method which comprises dissolving EVOH in a solvent and reacting it with hydrogen peroxide and persulfuric acid for oxidation treatment, it is impossible to completely preclude colorization of the product oxidation-treated polymer solution or aging (loss of standing stability) of the solution. By the method of this invention, however, a solution with good clarity, free of coloration and having good standing stability can be obtained.

Furthermore, by coating a substrate with this oxidation-treated polymer solution, a transparent film with good gas-barrier property can be obtained with excellent high-speed coatability.

The following examples are further illustrative of this invention. Unless otherwise indicated, all parts and % are by weight.

Example 1

To 57 parts of a solvent mixture of water (50%) and isopropyl alcohol (50%) was added 30 parts of EVOH (ethylene content Et: 30 mol %, degree of saponification SV: 99.5 mol %, the melting point Tm found from the peak temperature measured with a differential scanning calorimeter: 187° C.) and the mixture was stirred at 60°–70° C. for about 2 hours to prepare a clear solution. The viscosity of this solution was 50000 cps/40° C.

The Tm of this starting polymer satisfies the relation $Tm \geq -109 - 1.46\ Et + 3.31\ SV$ as the right-hand term of the relation can be solved as follows.

$-109 - 1.46 \times 30 + 3.31 \times 99.5 = 177$

To the solution thus obtained was added 13 parts of a 35% aqueous solution of hydrogen peroxide as well as 50 ppm, as polyvalent metal with respect to the whole system, of $FeSO_4 \cdot 7H_2O$ and the reaction was carried out at 80° C. with constant stirring for 4 hours. The reaction mixture was then cooled to 40° C. and catalase was added at a final concentration of 3000 ppm to decompose and dispose of the residual hydrogen peroxide, whereby an oxidation-treated polymer solution of about 30% concentration was obtained. The viscosity of this solution was 700 cps/40° C.

The melting point T (the melting point found from the peak temperature measured with a differential scanning calorimeter) of the EVOH in the above oxidation-treated polymer solution was 148° C.

The melting point T of this oxidation-treated polymer satisfies the relation $-209 - 1.46\ Et + 3.31\ SV < T < -109 - 1.46\ Et + 3.31\ SV$ as the right-hand term can be solved as $-109 - 1.46 \times 30 + 3.31 \times 99.5 = 177$ and the left-hand term as $-209 - 1.46 \times 30 + 3.31 \times 99.5 = 77.$ The oxidation-treated polymer solution thus obtained was allowed to stand in a constant-temperature room at 20° C. and the time in days to solidification was determined to evaluate its standing stability.

On the other hand, the above oxidation-treated polymer solution was diluted with a solvent mixture of water and isopropyl alcohol (1:1, by weight) to a concentration of 20%. This dilution was coated on a biaxially oriented polypropylene film at high speed and the maximum speed at which a homogeneous coating film without longitudinal streaks or blisters could be obtained was determined. The appearance of the coating layer was also visually evaluated.

Furthermore, using a bar coater, the above oxidation-treated polymer solution was coated on the corona-treated surface of a 20 μm-thick biaxially oriented polypropylene film and the coating was dried at 100° C. for 3 minutes to prepare a 3 μm-thick coating layer. Then, the oxygen permeability ($cc/m^2 \cdot day \cdot atm$) (20° C., 0% RH) of this laminate was measured. From a laminate constructed in the same manner as above (but the coating was applied to the surface not corona-treated), the coating film was peeled off to isolate a 3 μm-thick EVOH monolayer film and the transparency of this film was evaluated in terms of haze.

Examples 2–6

Oxidation-treated polymer solutions were prepared by the procedure described in Example 1. However, in Examples 4, 5 and 6, $CuCl_2$, $TiCl_3$ and $CrCl(H_2O)_5Cl_2 \cdot H_2O$ were added, respectively, as the polyvalent metal salt at the level of 50 ppm on a polyvalent metal basis.

Comparison Example 1

The same starting EVOH as used in Example 1 was dissolved in the solvent mixture and the solution, not oxidized, was evaluated.

Comparison Examples 2–4

The procedure of Example 1 was repeated except that no polyvalent metal salt was used in the oxidation treatment. In Comparison Example 3, the oxidation reaction time was extended to 30 hours.

Comparison Example 5

The procedure of Example 1 was repeated except that isopropyl alcohol alone was used as the solvent, 35 parts of 35% hydrogen peroxide solution was added and the polyvalent metal salt was used in a concentration of 5000 ppm.

(Conditions and Results)

The conditions of the above Examples 1–6 and Comparison Examples 1–5 are shown in Table 1 and the results are shown in Table 2. In the tables, IPA stands for isopropyl alcohol and $H_2O_2$ for a 35% aqueous solution of hydrogen peroxide.

TABLE 1

| | Starting EVOH | | | | Formulation | | | | Polyvalent metal salt | | Treating conditions | |
|---|---|---|---|---|---|---|---|---|---|---|---|---|
| | Et | SV | Tm | Tm≧ | EVOH | $H_2O$ | IPA | $H_2O_2$ | | | Temperature | Time |
| Example 1 | 30 | 99.5 | 187 | 177 | 30 | 22 | 35 | 13 | $FeSO_4$ | 50 | 80° C. | 4 hr |
| Example 2 | 40 | 99.9 | 171 | 163 | 30 | 22 | 35 | 13 | $FeSO_4$ | 200 | 80° C. | 4 hr |
| Example 3 | 40 | 96.0 | 158 | 150 | 30 | 22 | 35 | 13 | $FeSO_4$ | 75 | 80° C. | 4 hr |
| Example 4 | 30 | 99.5 | 187 | 177 | 30 | 22 | 35 | 13 | $CuCl_2$ | 50 | 80° C. | 4 hr |
| Example 5 | 30 | 99.5 | 187 | 177 | 30 | 22 | 35 | 13 | $TiCl_3$ | 50 | 80° C. | 4 hr |
| Example 6 | 30 | 99.5 | 187 | 177 | 30 | 22 | 35 | 13 | $CrCl(H_2O)_5 \cdot H_2O$ | 50 | 80° C. | 4 hr |
| Comparison Example 1 | 30 | 99.5 | 187 | 177 | 30 | 35 | 35 | — | — | — | | |
| Comparison Example 2 | 30 | 99.5 | 187 | 177 | 30 | 22 | 35 | 13 | — | — | 80° C. | 4 hr |
| Comparison Example 3 | 30 | 99.5 | 187 | 177 | 30 | 22 | 35 | 13 | — | — | 80° C. | 30 hr |
| Comparison Example 4 | 40 | 99.9 | 171 | 163 | 30 | 22 | 35 | 13 | — | — | 80° C. | 4 hr |
| Comparison Example 5 | 30 | 99.5 | 187 | 177 | 30 | 0 | 35 | 35 | $FeSO_4$ | 5000 | 80° C. | 10 hr |

(Note)
In the Starting EVOH column, the unit for Et and SV is mol %, the unit for Tm is °C., and Tm≧ is the lower limit to the Tm of starting EVOH.
Each numeral in the Formulation column represents the number of parts; provided, however, that each numeral for 'polyvalent metal salt' represents the number of parts per million (ppm) as the polyvalent metal.

TABLE 2

|  | Oxidation-treated EVOH | | Standing stability | Oxygen permeability | Clarity (haze) | High-speed coatability (m/min) | Appearance of film at maximum line coating speed |
|---|---|---|---|---|---|---|---|
|  | T | <T< | | | | | |
| Example 1 | 148 | 77 < T < 177 | 115 (days) | 3.0 | 1.8% | ≧100 | Colorless, clear |
| Example 2 | 135 | 63 < T < 163 | 105 | 4.5 | 2.1% | ≧100 | Colorless, clear |
| Example 3 | 132 | 50 < T < 150 | 100 | 4.8 | 1.9% | ≧100 | Colorless, clear |
| Example 4 | 145 | 77 < T < 177 | 120 | 2.8 | 2.0% | ≧100 | Colorless, clear |
| Example 5 | 145 | 77 < T < 177 | 125 | 2.9 | 2.0% | ≧100 | Colorless, clear |
| Example 6 | 145 | 77 < T < 177 | 130 | 2.5 | 2.2% | ≧100 | Colorless, clear |
| Comparison Example 1 | — | — | <3 | 2.5 | 10.5% | 18 | Colorless, clear, longitudinal streaks formed |
| Comparison Example 2 | 180 | 77 < T < 177 | 10 | 2.8 | 8.7% | 30 | Colorless, clear, longitudinal streaks formed |
| Comparison Example 3 | 149 | 77 < T < 177 | 65 | 6.3 | 3.2% | ≧100 | Yellowing |
| Comparison Example 4 | 167 | 63 < T < 163 | 7 | 4.5 | 7.2% | 20 | Colorless, clear, blistered |
| Comparison Example 5 | 65 | 77 < T < 177 | 130 | 50.5 | 5.0% | ≧100 | Yellowing |

(Note)
In the Oxidation-treated EVOH column, the unit for T is °C. and <T< are the upper and lower limits to the T of oxidation-treated EVOH.
The unit for oxygen permeability is $cc/m^2 \cdot day \cdot atm$ (20° C., 0% RH).

INDUSTRIAL APPLICABILITY

The oxidation-treated polymer solution obtainable by the method of this invention can be coated on a substrate to provide a laminate having gas-barrier property. This laminate is of value as a packaging material for food, beverages, chemicals, drugs, agro-chemicals, electronic parts, etc. It is also of value as an architectural or car interior material. In addition, the above oxidation-treated polymer solution can be utilized as an adhesive agent for the bonding of optical film and like.

What is claimed is:

1. A method of producing an oxidation-treated polymer solution which comprises;

using a saponified ethylene-vinyl acetate copolymer (EVOH) satisfying all the following relations:

$$20 \leq Et \leq 60,$$

$$90 \leq SV \leq 100$$

$$Tm \geq -109 - 1.46\, Et + 3.31\, SV$$

where Et (mol %) represents the ethylene content of saponified ethylene-vinyl acetate copolymer (EVOH), SV (mol %) represents the degree of saponification of EVOH, and Tm (°C.) represents the melting point of EVOH as found from the peak temperature measured with a differential scanning calorimeter, as the starting polymer, oxidation-treating said starting polymer in solution in a solvent mixture of water and alcohol, where the mixing ratio of water to alcohol being 30:70 to 70:30 by weight, in the concomitant presence of 1–100 weight %, with respect to the starting polymer, of hydrogen peroxide and 5–2000 ppm, with respect to the whole solution, of a polyvalent metal salt and then, adding an enzyme to the oxidation-treated polymer solution to decompose and dispose of the residual hydrogen peroxide to provide an oxidation-treated polymer satisfying the relation $$-209 - 1.46\, Et + 3.31\, SV < T < -109 - 1.46\, Et + 3.31\, SV$$

(where T (°C.) is the melting point found from the peak temperature measured with a differential scanning calorimeter) in a solution form.

2. A method of producing a laminate which comprises coating a plastic substrate with the oxidation-treated polymer solution obtained by the method claimed in claim 1.

* * * * *